Oct. 9, 1951    J. PFISTERSHAMMER    2,570,852
METAL RAKE

Filed June 26, 1947    2 Sheets-Sheet 1

Inventor
JOSEF PFISTERSHAMMER
By Haseltine, Lake & Co.
Agents

Oct. 9, 1951     J. PFISTERSHAMMER     2,570,852
METAL RAKE
Filed June 26, 1947                    2 Sheets-Sheet 2
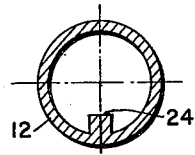
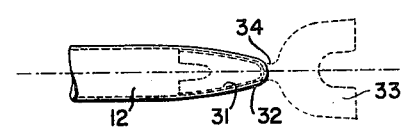
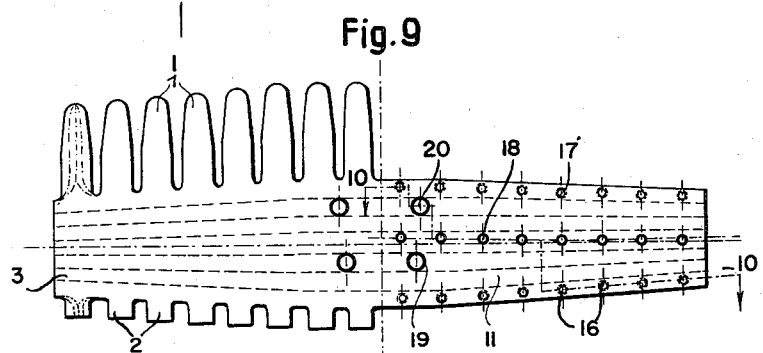
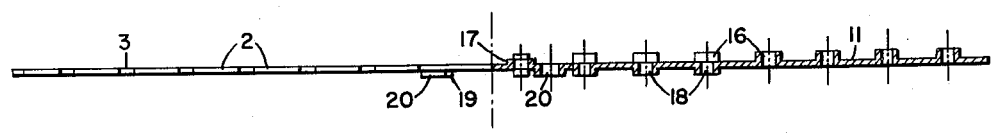
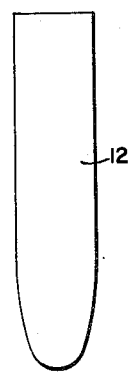   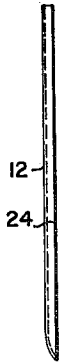
Inventor
JOSEF PFISTERSHAMMER
By Haseltine, Lake & Co.
Agents Patented Oct. 9, 1951

2,570,852

UNITED STATES PATENT OFFICE 2,570,852

METAL RAKE

Josef Pfistershammer, Wilhelmsburg, Austria

Application June 26, 1947, Serial No. 757,093
In Austria November 30, 1945

Section 1, Public Law 690, August 8, 1946
Patent expires November 30, 1965

4 Claims. (Cl. 56—400.01)

The handrake known hitherto, used for raking together, and for turning grass and hay have been made of hard wood, but also of iron, and sometimes of hardwood and iron combined. They are heavy, and present a great frictional resistance in consequence of their shape; and those made of wood also in consequence of their building material. Besides, the connection between the teeth and their support or carrier is faulty and deficient, considering that the holes, as hitherto made, for inserting the rake teeth and the rake stick have often weakened said support by up to 50%. Moreover, teeth shaped in accordance with usual procedure are likewise disadvantageous. Whereas the wooden teeth are, in general, straightlined and but pointed unilaterally, the metal teeth are in some cases straight and in other cases curved over a great part or over their whole free length. Both shapes are unfavourable. When the rake is applied to the soil at a great distance from where the operator stands, the teeth, if straight, will penetrate too deeply into the soil, whereas teeth bent up over the greater part of their length will not take up the material so easily when the rake operates near to the worker, let alone that the material sticks to the teeth, and is not readily separated from same. All these drawbacks are avoided by the present invention.

The drawings represent two embodiments of the invention by way of examples:

Figure 7 is a section through one of the teeth, on a scale comparable to that of Figures 2 and 5 taken on the line 7—7 of Figure 5.

Fig. 8 represents the process of constructing a particularly reinforced tooth point.

Figs. 9 and 10 are plans and lateral elevations (partly in section taken on the line 10—10) of the punched, but not yet stamped or formed sheet metal the part to the left of the center line relating to the rake according to the Figs. 1, 2, and that to the right of the center line to the rake according to the Figs. 3, 4.

Figure 5:
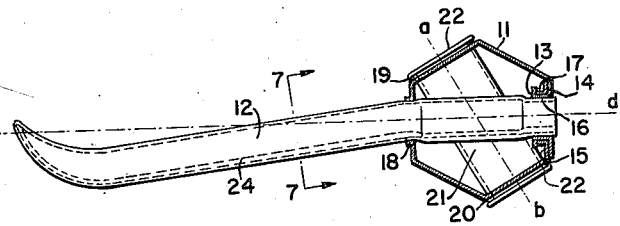
Figure 5 is a section similar to that of Figure 2, also to an enlarged scale through line 5—5 of Figure 3.
Figure 6:
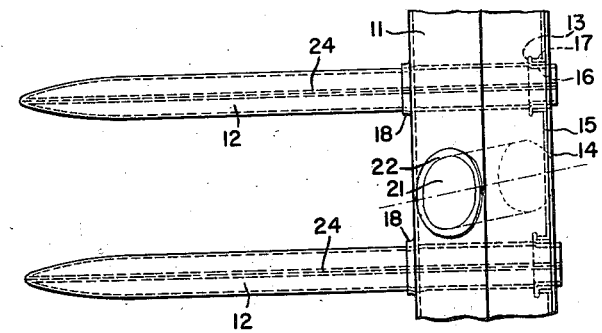
Fig. 6 is a plan, on an enlarged scale, of a part of the rake-head according to Fig. 3.

The Figs. 11 and 12 show the raw metal sheet (blanks) for a rake tooth according to Figs. 5–7, punched to size, but still undeformed.

The Figs. 13 and 14 show the metal sheet according to Figs. 11 and 12, punched, and pre-bent for finishing under the press.

Figure 1:
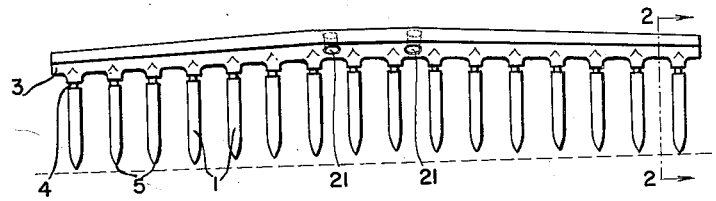
Fig. 1 shows a rake-head together with the rake teeth, made of one piece by punching, as seen from above.
Figure 2:
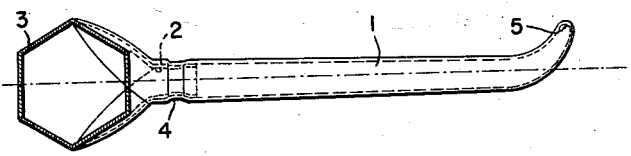
Figure 2 is a section through the line 2—2 of Figure 1 to an enlarged scale.

According to the Figs. 1 and 2 a rake is punched and pressed (stamped) from a very thin steel sheet or a thin, hard aluminium sheet. The rake teeth 1, and their supporting bushings 2 are all of a piece with the rake-head (carrier) 3, as seen in the development according to Figs. 9, 10 to the left of the center line. Said teeth are first pressed into a circular shape by means of mandrels, whereby the teeth 1 remain half open in the neighbourhood of the rake-head (carrier) 3 (shown in dash-dot lines for the first tooth). In the second and the third operation a pressing die is employed for imparting to the rake-head or carrier the cross-section desired, preferably a hexagonal one, which forces the supporting bushings 2, that previously had stood opposed to the teeth 1, to enter said teeth 1, open in the downward direction. By a further pressing operation the teeth 1 are closed round the supporting bushings 2, whereby—at the same time—the groove 4 is made, and the teeth points 5 are bent upwards as shown. Thus the supporting bushings 2 close the rake teeth 1 transforming it into a rigid, tubular or box-shaped beam resistant to bending and torsion strains, besides increasing the strength and the rigidity of the connection between the rake teeth and the rake-head (carrier), the grooves 4 assuring and enhancing this effect.

The Figs. 3–7 represent a second embodiment, the rake-head (carrier) 11 and the rake teeth 12 being separately punched from very thin metal sheets, and pressed, whereupon they are assembled to a hollow body. It is advisable to produce the head (carrier) from aluminium which is lighter though less resistant to wear, whilst the teeth are made of the harder mild steel sheets.

The hexagonal head 11, tapering towards the two ends, is lapped at the back (Figs. 5 and 6), the lap being equal to about one side of the hexagon. The two metal sheet borders 14 and 15 joined by lapping are provided with suitable holes, spaced according to the distances of the rake teeth, the borders being drawn inwards so as to form the bushings 16 and 17. The bore of the bushings 16 in the outer lap tallies most accurately with the maximum rake tooth diameter, whereas the length of the bushings 16 should be greater by about two sheet thicknesses than the length of the bushings 17 of the inner lap. The bore of the bushings 17 corresponds to that of the bushings 16 plus twice the thickness of the sheet. The bushings are punched in one operation together with the head or carrier, and are then drawn, as seen in the Figs. 9, 10 to the right of the center line. These bushings serve the purpose of rigid and securing rivets for closing the head, as indicated at 13, and they also accommodate the rake teeth. Also on the side opposite to the bushings 16, 17 the rake (carrier) 11 is formed by drawing with bushings 18 serving as second bearings for the rake teeth 12 which are forced by pressing through the bushings of the rake-head 11 (pressed fit). Said teeth have the shape of flattened cones, and accurately fit the bushings 16 and 18 so that when inserting the teeth under pressure the bushings are slightly expanded, and the teeth slightly strictured. Hence, the rake teeth are fixed most solidly, serving at the same time as spacing and stiffening rivets between the front and the rear wall of the head (carrier). Combined with the bushings 16 (13) acting as hollow rivets they increase the strength of the hollow beam closing it rigidly and securely.

Simultaneously with the bushings 16, 17 and 18 the larger bushings 19 and 20 are formed by drawing in the head or carrier, said bushings serving to lodge the sleeves 21 obliquely passing (axis a—b) through the rake-head 11 (Figs. 5 and 6). The sleeves 21 are intended to carry the rake stick split into two arms provided with carrying pins, the angle between said sleeves and the teeth being about 60°. The hexagonal cross-section of the rake-head (carrier) 11 facilitates the drawing and the flanging (beading) of the bushings 16—20, as these operations can be carried out on a plane. The free ends of the bushings 19 and 20 are made into rolls together with the ends of the sleeves 21 so as to stiffen the head and to increase its resistance.

In the vicinity of their points the rake teeth are bent up as shown. Hence the teeth will easily glide on the soil even if their position is a steep one, i. e. in case of long strokes of the rake; besides they do not get stuck in the soil. On the other hand the material operated upon (hay and the like) is readily taken up even in case of the rake teeth occupying a position nearly parallel to the soil which occurs when the operator draws the rake near, or uses it for turning the hay, or for similar work.

In order to increase the strength, and the resistance of the rake teeth against wear, the points and the bellies of the rake teeth are reinforced according to Figs. 5–7 by means of two inturned flanges 24 running from the point over the whole length of each rake tooth. Before the teeth are finally pressed the flanges 24 are bent up as shown in Figs. 13 and 14 on the punched tooth (Figs. 11, 12). The longitudinal rib formed by the flanges 24 efficaciously increases the resistance of the teeth against torsion in their head or carrier. For avoiding high torsional strains the rake teeth are bent backwards after their issue from the head or carrier so that the tooth points will not, or only by a few millimeters, overtop the imaginary extension of the axis c—d (Fig. 5) of the part fastened in the carrier 11. Teeth which have become useless by wear or damages can be easily replaced by spare teeth which are stuck from the rear through the rake-head and are made to rest against a hard supporting base, whereupon an energetic pressure towards the front of the head (carrier) suffices for pressing same completely into the rake-head.

Figure 3:
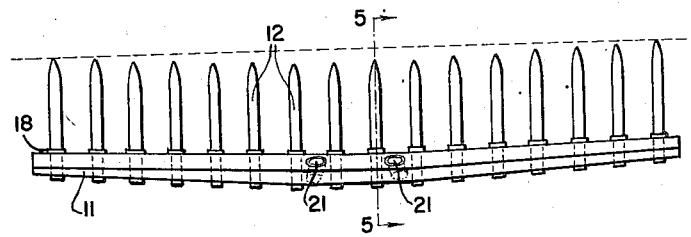
Fig. 3 is a plan of a rake-head fitted with teeth produced separately.
Figure 4:
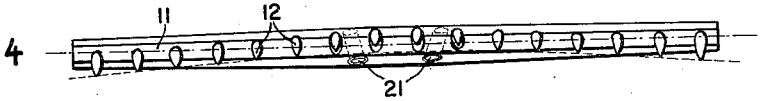
Fig. 4 is a front elevation thereof.

Fig. 4 shows that the rake teeth 12 are located in the head so as to form a flat curve whose deepest point is situated in the middle, this effect being attained by a suitable arrangement of the supporting bushings 2 or 18, determining the position of the teeth. The Figs. 1 and 3 show that the tooth points seen from above (in the operating direction) slightly recede—towards the middle of the rake—behind a straight line. Both features combined impart to the complete rake assembly the shape of a shallow basket, which is advantageous both in collecting as in spreading of grass and hay.

By applying a surface protection against corrosion, particularly by the immersion process, all junctions, and especially those between the rake teeth and the head are greatly reinforced; for example, in case a varnish is used which is capable of attaining a high degree of hardness, e. g. for aluminium rakes the varnish will stick to and penetrate into the bushings 16 and, chiefly 18, whose roots are open towards the teeth. Finally the connection between the head and the teeth may be reinforced and secured by expanding the teeth between the bushings 16 and 18, or by providing same with noses or grooves preventing this displacement.

A further, and very substantial reinforcement of the tooth points which are solely subjected to wear and tear, is attained by inserting and co-beading a piece of sheet metal 31 (Fig. 8) having essentially the shape of the tooth point development 32. The reinforcing inset may also, as shown in Fig. 8 at 33 by dash lines, be punched together with the metal sheet piece 32 so as to be connected with it at its points 34, whereupon it is bent into the position suitable for beading as occupied by the separately produced reinforcing metal sheet piece 31. Instead of an inset of sheet metal a short compact mandrel corresponding to the shape of the tooth point may also be pressed together with the tooth.

Having thus described the nature of my invention I claim and desire to secure by Letters Patent:

1. A metal rake comprising a hollow hexagonal head formed integrally from a single steel strip having tapered ends, said head having a plurality of pairs of holes formed therein through opposed flat sides of said hexagonal head, each of said holes having a bushing surrounding the same thereby providing two sets of opposed bushings, said bushings being integrally formed from said head, one set of said bushings extending inwardly within said hollow head and the bushings of the other set extending outwardly of said head, and a pressed steel tooth engaged in a pair of said opposite holes whereby the tooth is reinforced by the said bushings.

2. A metal rake according to claim 1 further including handle apertures extending through two of the opposed flat sides of said hexagonal head, the edges of said apertures being turned outwardly to form bushings on either side of said hexagonal head, and a sleeve connecting the opposite bushings of the handle apertures having at each end a flanged edge surrounding the outside of the handle bushings.

3. A metal rake comprising a hollow hexagonal head formed from a single steel strip having tapered ends, said head having a plurality of pairs of holes formed therein, each of said holes having a bushing surrounding the same, said bushings being integrally formed from said head, a pressed steel tooth engaged in a pair of said opposite holes whereby the tooth is reinforced by the said bushings, said teeth being arranged in said head in such a manner that the line connecting points of the teeth is curved in two planes and that the teeth each have the shape of a shallow basket.

4. A metal rake comprising a hollow hexagonal head formed from a single steel strip having tapered ends, said head having a plurality of pairs of holes formed therein, each of said holes having a bushing surrounding the same, said bushings being integrally formed from said head, a pressed steel tooth engaged in a pair of said opposite holes whereby the tooth is reinforced by the said bushings, said teeth being bent back at the point where they emerge from the head through a sufficient angle for the axis of the tooth portion situated inside the head to be only slightly overlapped by the point of the tooth.

JOSEF PFISTERSHAMMER.

REFERENCES CITED

The following references are of record in the file of this patent:

UNITED STATES PATENTS

| Number | Name | Date |
|---|---|---|
|  | Sanford & Parmlee | June 8, 1830 |
| 654,645 | Keiller | July 31, 1900 |
| 1,251,622 | Barley | Jan. 1, 1918 |

FOREIGN PATENTS

| Number | Country | Date |
|---|---|---|
| 23,042 | Sweden | Aug. 31, 1907 |
| 68,123 | Switzerland | Mar. 21, 1914 |
| 279,330 | Germany | Oct. 16, 1914 |
| 283,668 | Great Britain | Jan. 19, 1928 |